United States Patent
Mascellaro

(10) Patent No.: US 11,034,413 B2
(45) Date of Patent: Jun. 15, 2021

(54) HULL FOR LOW DRAG BOATS

(71) Applicant: MONOTRICAT SRL C.R., Rome (IT)

(72) Inventor: Luigi Mascellaro, Rome (IT)

(73) Assignee: MONOTRICAT SRL C.R., Rome (IT)

( * ) Notice: Subject to any disclaimer, the term of this patent is extended or adjusted under 35 U.S.C. 154(b) by 0 days.

(21) Appl. No.: 15/315,194

(22) PCT Filed: Jun. 11, 2014

(86) PCT No.: PCT/IB2014/062140
§ 371 (c)(1),
(2) Date: Dec. 1, 2016

(87) PCT Pub. No.: WO2015/189660
PCT Pub. Date: Dec. 17, 2015

(65) Prior Publication Data
US 2017/0152003 A1    Jun. 1, 2017

(51) Int. Cl.
| | |
|---|---|
| *B63B 1/00* | (2006.01) |
| *B63B 1/04* | (2006.01) |
| *B63B 1/08* | (2006.01) |
| *B63B 1/20* | (2006.01) |
| *B63B 3/38* | (2006.01) |

(52) U.S. Cl.
CPC ............... *B63B 1/042* (2013.01); *B63B 1/08* (2013.01); *B63B 1/20* (2013.01); *B63B 3/38* (2013.01); *B63B 2001/201* (2013.01); *Y02T 70/10* (2013.01)

(58) Field of Classification Search
CPC .. B63B 1/04; B63B 1/042; B63B 1/08; B63B 1/16; B63B 1/20; B63B 3/38; B63B 35/34; B63B 35/38; B63B 2001/203; B63B 2001/16; B63B 2001/186; B63B 2001/20; B63B 2001/201
USPC .... 114/56.1, 61.2, 61.27, 61.29, 61.3, 61.31, 114/61.32, 61.33, 63, 278, 283, 288, 290, 114/291, 292
See application file for complete search history.

(56) References Cited

U.S. PATENT DOCUMENTS

| | | | |
|---|---|---|---|
| 1,042,636 A | 10/1912 | Apel | |
| 3,203,389 A * | 8/1965 | Cale .......................... | B63B 1/20 114/289 |
| 3,469,557 A | 9/1969 | Wollard | |
| 3,885,514 A * | 5/1975 | Lauenborg ................ | B63B 1/12 114/288 |

(Continued)

FOREIGN PATENT DOCUMENTS

| | | | | |
|---|---|---|---|---|
| EP | 1211171 A1 * | 6/2002 | ............... | B63B 1/08 |
| EP | 1501718 A1 | 2/2005 | | |

(Continued)

OTHER PUBLICATIONS

International Search Report and Written Opinion of the International Searching Authority dated Sep. 12, 2014.

(Continued)

*Primary Examiner* — Daniel V Venne
(74) *Attorney, Agent, or Firm* — Nixon & Vanderhye

(57) ABSTRACT

A hull for low drag boats has, from bow to stern, a deep V-shaped keel (10) whose dead-rise angle decreases up to a flattened bottom (30) in the stern, and sides (20) comprising side chines (200) protruding downward from the flattened bottom that is not inclined upwards.

5 Claims, 3 Drawing Sheets

(56) References Cited

U.S. PATENT DOCUMENTS

| | | | | |
|---|---|---|---|---|
| 4,300,889 A | * | 11/1981 | Wormser | B63H 5/16 |
| | | | | 440/69 |
| 4,587,918 A | * | 5/1986 | Burg | B63B 1/38 |
| | | | | 114/67 A |
| RE36,879 E | * | 9/2000 | Schoell | B63B 1/20 |
| | | | | 114/271 |
| 7,165,503 B2 | * | 1/2007 | Mascellaro | B63B 1/20 |
| | | | | 114/290 |
| 7,677,192 B2 | * | 3/2010 | Seism | B63B 1/042 |
| | | | | 114/288 |

FOREIGN PATENT DOCUMENTS

| | | |
|---|---|---|
| FR | 2604412 A1 | 4/1988 |
| GB | 1104202 A | 2/1968 |
| GB | 1545900 A | 5/1979 |
| WO | 03/095296 A1 | 11/2003 |

OTHER PUBLICATIONS

Search Report and Opinion of Italian Patent Office dated Dec. 16, 2013.

* cited by examiner

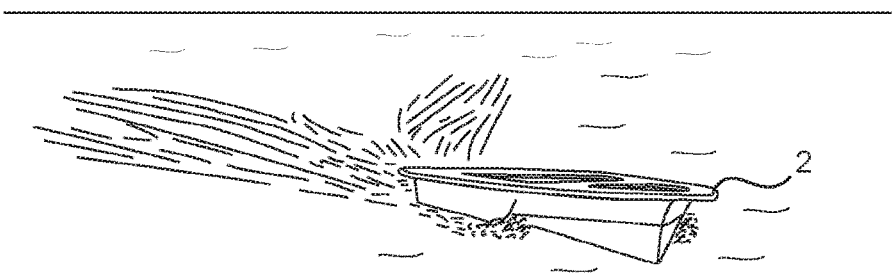
PRIOR ART Fig. 1
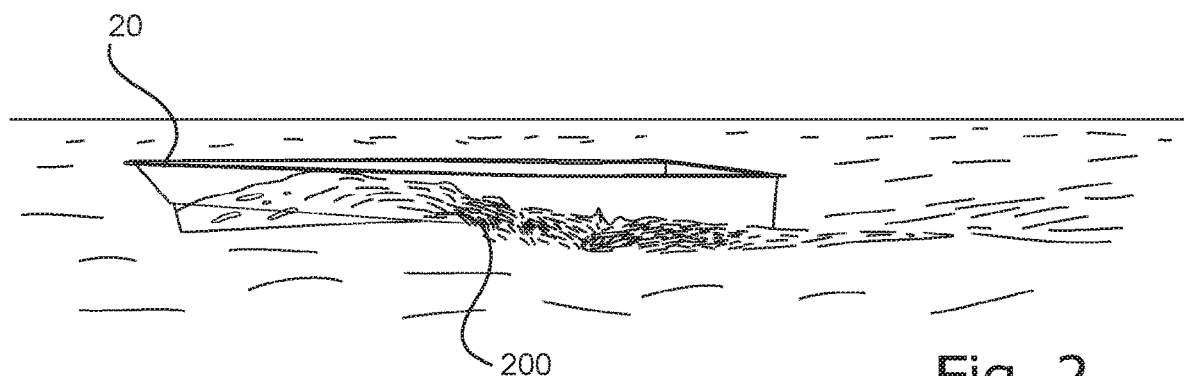
Fig. 2
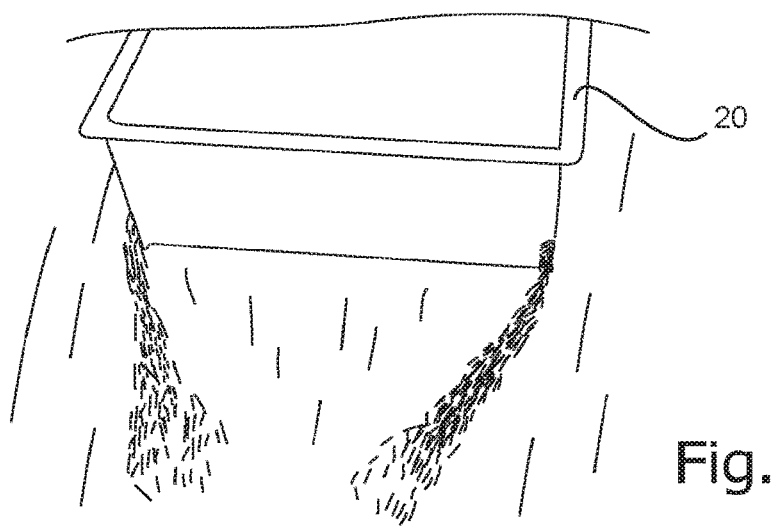
Fig. 3

HULL FOR LOW DRAG BOATS

TECHNICAL FIELD

The present invention relates to a hull for low drag boats.

The main goal in ship design is to reduce the surface friction and the extension of the wetted surface that cause the drag. The main aims are to reduce the fuel cost affecting maritime transportation and hindering marine business development, as well as to increase ship speed in general.

BACKGROUND ART

In the past considerable efforts to increase the ship speed have been made. For example, drag is reduced in planing hull boats by raising their bow, decreasing thereby the surface of the hull which is in contact with water. Other boats with planing hulls, includes a stepped configuration which is provided for a ventilation of the hull, in order to reduce the actual surface area which is in contact with water. Another way is to inject air under the hull or to form an air cushion beneath it, or to direct bubbles in some areas of the hull itself.

FR 2,604,412 describes a hull for fast boats where there is a front hull part having a deep V-shaped profile with a gradually increasing angle from bow to stern, and a rear hull part having sides provided with longitudinal floats. In the bottom of the hull a volume is delimited by the bow, the longitudinal floats and a drain valve, volume in which a supporting air cushion is formed thanks to centrifugal fans that send air under pressure to nozzles in the hull surface. The boat described in the patent FR 2 604 412 is within the field of the so-called Air Support Vessels (ASV), which includes also the hovercrafts. However, the air under pressure is a medium that supports the hull less than the water does; anyway to blow air under the hull means using a lot of energy with consequent drawbacks.

Many documents describe hulls in which air is blown in the surrounding liquid medium with a result of forming bubbles for drag reduction: see for example inventions described by U.S. Pat. No. 6,186,085, U.S. 2002/0014192 A1, WO 2011/161,187 A1, JP10175587A. The blowing of air in the interface between the hull and the water causes the formation of foam. Even if the foam does not support the hull, the foam provides the advantage of breaking the boundary layer formed by the surface friction and generate a turbulent flow that replaces the laminar flow. Generally the hulls described in the above mentioned patents require an increase in power consumption, i.e. the power which serves to blow air under the hull.

European patent EP 1 501 718 of the same applicant describes a mono-hull in which a midship cross section on the waterline divides a front hull part, including a central keel, from a rear hull part having sides provided with chines that limit a progressively raising bottom in aft direction, i.e. inclined upward, from the central keel aft toward the waterline. The front hull part has a deep V-shaped profile, with the central keel extending in after direction with the angle formed by the V-shaped profile increasing up to create a flattened bottom.

The hull described by EP 1 501 718 should receive in its bottom the bow wave system and then recover some of the power consumed in forming that bow wave system in order to increase its hydrodynamic support and maintain a nearly horizontal trim.

On the boat described in the European patent EP 1 501 718, if the bow is raised, the boat cannot generate the wave formation that is recovered in the rear of the boat between the side chines, and which allows the hull to be hydrodynamically sustained.

Further, if the bow is raised, it does not produce the turbulent flow and the foam that is interposed between the hull surface and the water, which has been proved to be essential for greatly reducing drag friction.

Again with reference to the bow raising, the feature of the bottom that raises, as illustrated, described and claimed in mono-hull according to the cited patent EP 1 501 718, is associated with the increased forward speed of the boat, which causes the hull to rotate around its center of gravity and results in taking immediately a trim such as to eliminate the angle that the bottom forms with the water surface when the boat is stationary. In other words, the raising bottom is positioned horizontally with the consequence of raising the bow.

This trim is also accentuated by the fact that a thruster, usually positioned in the stern area, "empties" the rear hull part between the side chines during its normal operation. Therefore it should be understood that, because of this "emptying" of the rear hull part, the bow raises further and, then, as mentioned above, does not perform its function, i.e. to generating the turbulent flow and the foam associated herewith.

The behavior of the known hull 2 is represented in a drawing made from a photograph (FIG. 1), in which a model is seen while being tested in tow towards the end of 2008 in the Froude's tank of the University of Trieste. The hull 2 is of the mono-catamaran type. The known boat has a keel in the front hull part and sides with side chines in the rear hull part. The deep V-shaped keel begins to flatten aft of midship. The bottom aft of midship between the side chines raises upwards, that is to say, it is inclined upwards from the horizon.

The model corresponds to an actual hull of 24 m and 70 t advancing at 24 knots. It is noted that the keel is raised, but it was observed during the various series of tests that already at 10 knots the model assumed that trim. In other words the profile of the rear hull part puts the boat even at low speeds in a stern-down trim. With this trim the keel that is just little immersed, no longer performs its function of generating the wave formation and the foam.

Briefly, it should be understood that the drawbacks caused by the raising bow are determined mainly by the fact that the bottom, the surface of which is predominant in the boat raising, is on the rise. The boat takes on a trim dependent on this rise angle of the bottom as the boat rotates around its center of gravity with a result of raising the bow.

To overcome these drawbacks caused by the raising bow, a first solution would be to make the bow very deep, so that the bow can generate the wave formation and the foam even when the bottom of the rear hull part is positioned horizontally. In this solution however the drag at low speed would be too high when the bow is deep in the water.

Another solution could be to provide the hull with large flaps protruding from the stern. For this solution however, the flaps would significantly increase the drag especially at high speeds.

The solution to the above mentioned drawbacks is achieved according to the present invention by a not raising bottom, i.e. a bottom that is not inclined upwards with respect to the horizon, aft of the midship cross section.

SUMMARY OF THE INVENTION

Therefore, the present invention provides a hull for low drag boats, having from bow to stern a deep V-shaped keel whose dead-rise angle decreases up to a flattened bottom in the stern, and sides comprising side chines protruding downward from the flattened bottom, wherein said flattened bottom is not inclined upwards.

Briefly, the hull according to the present invention has a bottom horizontal or inclined downward from the midship cross section up to the stern according to three variants of the embodiment of the invention, and the choice of either variant depends on the field of use of the boat according to the invention.

The architecture of the hull, with its deep V-shaped keel and sides provided with side chines or skegs protruding downward, gives the boat stability and maneuverability that reduce the negative impact of a low dead-rise angle substantially on most of the boat sections.

BRIEF DESCRIPTION OF DRAWINGS

Further features and advantages of the present invention will become more apparent from the indicative, and therefore non-limiting description of a preferred but not exclusive embodiment of a hull for low drag boats and of variants thereof, as illustrated in the accompanying drawings in which:

FIG. 1 shows the behavior of a known hull, in a drawing made from a photograph of a test performed in a Froude's tank;

FIGS. 2 and 3 are drawings from photographs that depict a complete view and a partial view limited to the stern respectively, of a model tested in late 2011 in the Froude's tank I. N. S. E. A. N. of the Consiglio nazionale delle ricerche (CNR, National Research Council) in Rome, the model corresponding to a 70 t and 24 m vessel according to the invention at 24 knots;

DESCRIPTION OF PREFERRED EMBODIMENTS OF THE INVENTION

Figure 4:
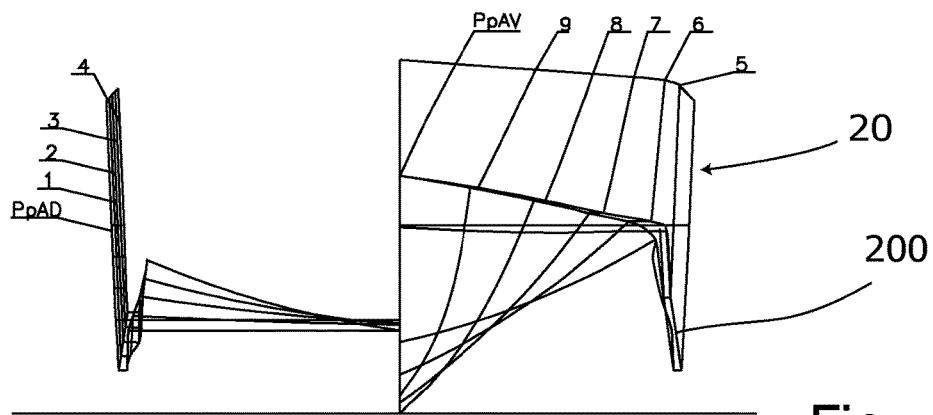
FIG. 4 is a schematic construction plan of the embodiment of the hull in FIGS. 2 and 3.
Figure 5:
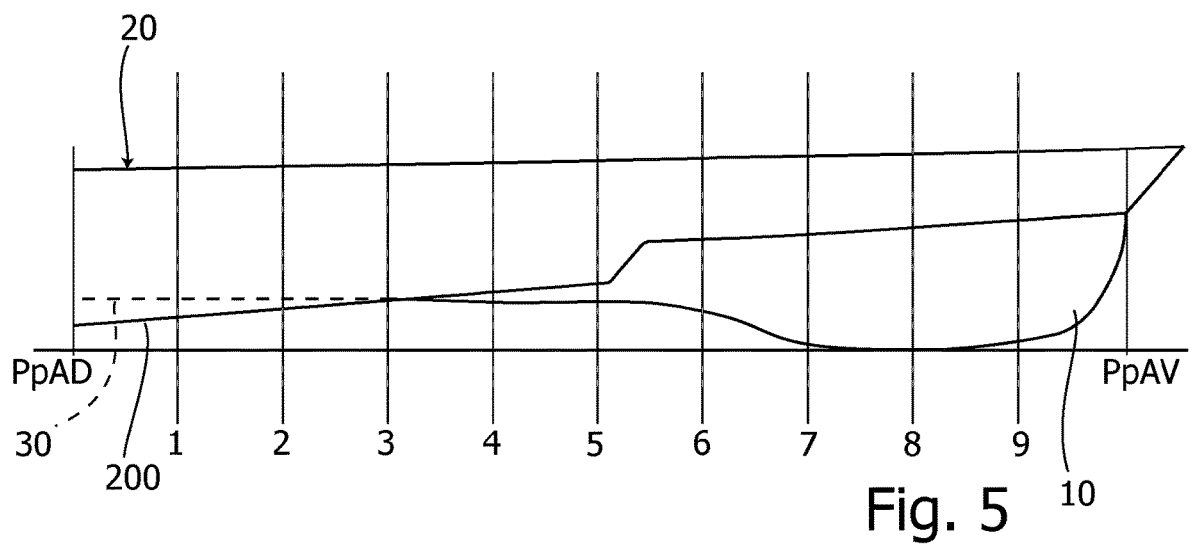
FIG. 5 is a schematic side view of the embodiment of the hull in FIG. 4.

A schematic representation of the hull according to the present invention is shown in FIGS. 4 and 5, which are a schematic plane of the construction of a first embodiment of the hull, and a schematic side view respectively of the same. In these figures, the different cross sections between the stern indicated as PpAD and the bow indicated as PpAV are marked with reference numerals 1 to 9 on the base. Sides 20 have side chines 200 projecting downwards that begin in the midship cross section marked with 5 and continue towards the stern. The midship cross section at the waterline separates a front hull from a rear hull part. The front hull part has a deep V-shaped keel 10 whose dead-rise angle decreases up from the bow to a flattened bottom 30 of the hull in the aft-most portion of the stern, the flattened bottom extending across a majority of a width of said hull at said aft-most stern portion. The rear hull parts has sides 20 including side chines protruding downwards from the flattened bottom 30 that is delimited by the side chines 200. The thickness of the side chines 200 in the sides 20 can be chosen according to different design requirements, with the consideration that the side chines 200 do not have a floating function either in a static or in a dynamic condition of the boat. The side chines 200 have only a function of conveying the flow coming from the bow and containing it in the stern portion of the boat. Therefore, the side chines 200 can be very thin like skegs.

The keel 10 extends from the bow towards the stern transforming its own profile from a deep V-shape to a flattened bottom 30 that, according to the invention, extends up to the stern and which is disposed horizontally, as schematically shown in FIG. 5. Moreover, the flattened bottom 30 is preferably inclined downward in the last tract between the cross sections 1 and PpAD. It should be understood that the construction plan according to FIGS. 4 and 5, is not exactly an ideal hull profile, due to problems arising from the scale model. This construction however simply indicates a pattern of the bottom in the rear hull part, which is the main feature of the present invention.

The keel 10 ahead the sides 20 protruding downwards by their side chines 200 that limit the flattened bottom 30 has the function of capturing the transverse waves and the foam associated therewith. Proceeding aft, the side chines 200 increase their immersion in the water and form together with the flattened bottom 30 an inverted channel for containing water, such that the kinetic energy of the water is transformed into pressure energy.

Reference is made now to FIG. 2, which shows a drawing from a photograph of a model with a conformation very similar to that shown in FIGS. 4 and 5. The photograph was taken during the tests carried out at the end of 2011, in the Froude's tank I. N. S. E. A. N. of CNR in Rome. The model represents a mono-catamaran hull provided with a bottom that remains generally horizontal in its rear part, between the midship cross section and the stern. This model corresponds to a 70 t and 24 m vessel at 24 knots.

Figure 6:
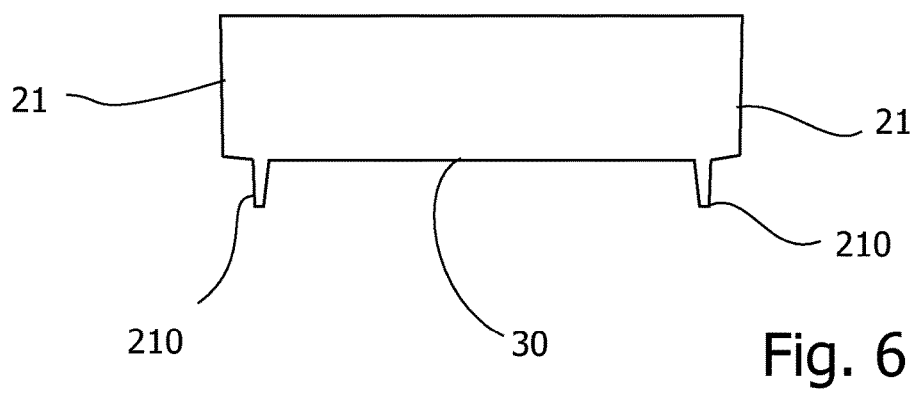
FIG. 6 is a cross section of a first variant of the hull in FIGS. 2 and 3.

As seen in FIG. 2, in which the conditions of displacement and speeds are the same as the conditions of the boat shown in FIG. 1, the hydrodynamic rise of the bow is balanced by the rise of the stern section, due to the wave formation and the foam conveyed between the side chines. The trim of the hull remains within about 1 degree with respect to the horizon. This allows the bow to generate wave formation and foam that are well highlighted in FIG. 2. Since the hull maintains substantially the same trim that it would have when stationary, an effective water flow is allowed from the stern section, as shown in FIG. 2, corresponding to the cited photograph, by the lack of wave formation aft of the tested model. This lack of wave formation is evidenced in FIG. 3 corresponding to the cited photograph that shows the flow of water coming out aft from the hull bottom as completely flattened. An intersection line of the side chines 200 with the flattened hull bottom 30 is inclined downward aft of amidships, as shown in FIG. 4. Shown in FIG. 6 is a cross section of a first variant of the hull according to the present invention. According to this variant, sides 21 have side chines 210 in the form of a boat skeg protruding downwards but recessed with respect to the sides 21 so that a portion of the flattened bottom 30 is limited between the skegs.

This modification is useful to avoid, in an anchored boat, that the side chines 200, which limit the bottom 30 in the first embodiment, collide with a pier or a jetty in case of rolling in rough sea. The damage or partial removal of the side chines 200 protruding downward would restrict their function, with serious consequences to the controllability and maintaining the boat's route.

Furthermore, the fact that the side chines 210 are recessed with respect to the sides 21 partially limits the amount of foam that is incorporated under the hull, and allows the creation of a housing for the thrusters.

Figure 7:
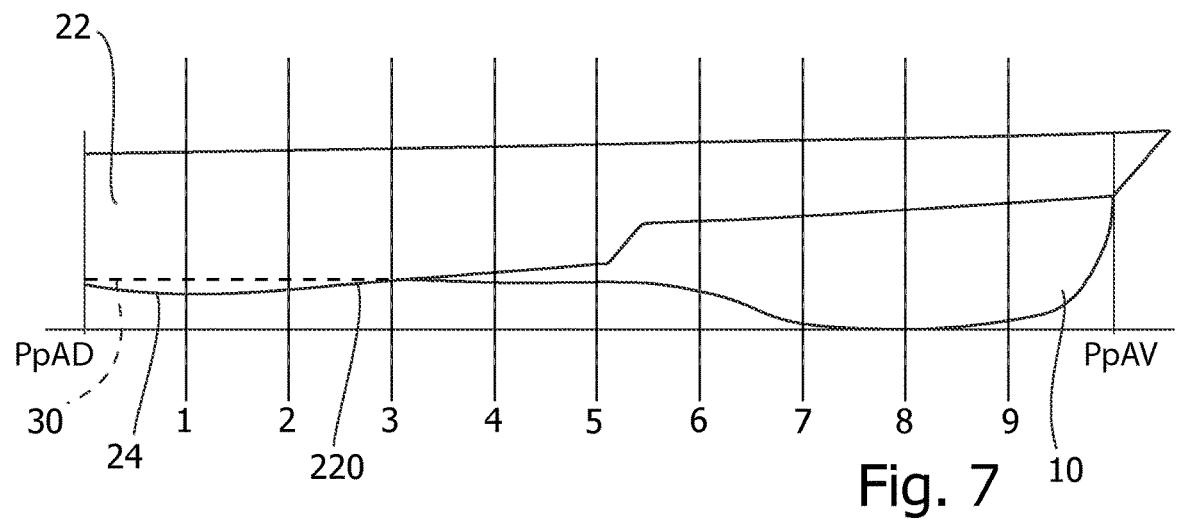
FIG. 7 is a schematic side view of a second variant of the hull in FIGS. 2 and 3.

Depicted in FIG. 7, showing a second variant of the present invention, are sides 23 with side chines 230 projecting downward but raising abaft in a portion 24 thereof. According to this variant, the outflow cross section of water and foam conveyed between the side chines protruding downward increases. The advantage is achieved that the outflow speed of the water decreases abaft, and accordingly the pressure near the aft cross section of the hull increases. This condition is useful because it improves the efficiency of the thrusters chosen for a specific architecture of the hull according to the present invention. The thrusters take accelerated water and push it against a high pressure zone.

Figure 8:
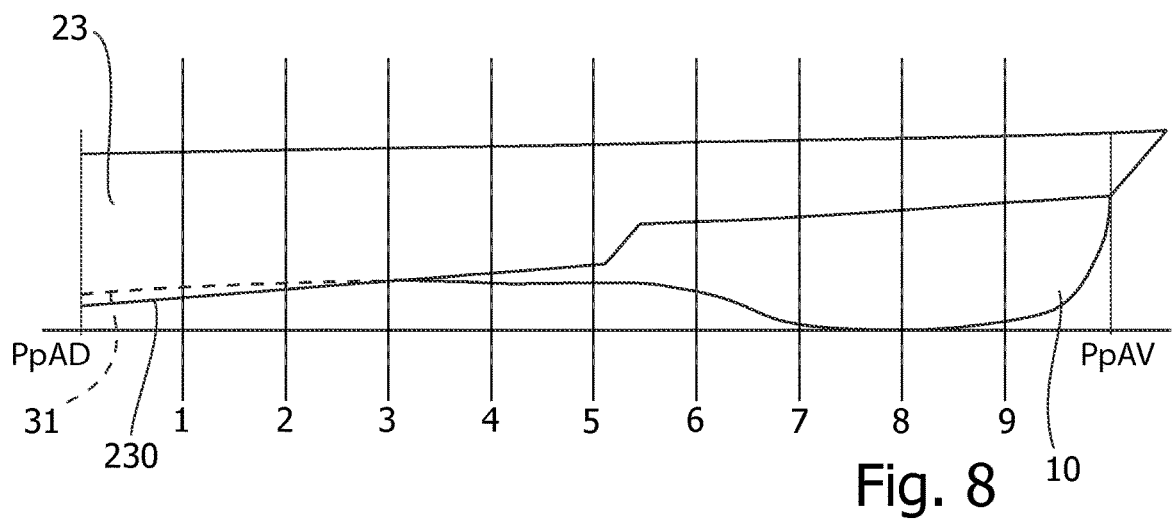
FIG. 8 is a schematic side view of a third variant of the hull in FIGS. 2 and 3.

With reference to FIG. 8, which is a schematic side view of a third variant of the boat hull in FIGS. 2 and 3, one can appreciate that a bottom 31 is inclined downward and limited by downward inclined side chines 230 of sides 23. The side chines 230 have rectilinear low edges.

It should be understood that this third variant of the hull according to the invention is useful for a boat with improved performances in speed and stability.

The above described features are to be understood as simply referred to an embodiment of the invention and to variants thereof and modification can be made without departing from the scope defined in the appended claims.

The invention claimed is:

1. A hull for reducing drag, the hull comprising:
   a V-shaped keel (10) defined at a bow of the hull, said V-shaped keel having a dead-rise angle which decreases up to a flattened bottom (30; 31) of said hull defined in an aft-most stern portion of the hull, said flattened bottom extending across a majority of a width of said hull at said aft-most stern portion, and
   sides (20; 21; 22; 23) comprising side chines (200; 210; 220; 230) protruding downward from the flattened bottom (30; 31), forming together with said flattened bottom a channel for capturing transverse waves and foam associated therewith,
   wherein said flattened bottom (30; 31) is inclined downwards; and
   wherein said side chines are vertically elongated (200; 210; 220; 230) beginning in a midship cross section of said hull and continuing towards said aft-most stern portion.

2. The hull according to claim 1, wherein said side chines (200) prolong said sides (20).

3. The hull according to claim 1, wherein said side chines (210) are internally offset from said sides (21) in a form of skegs.

4. The hull according to claim 1, wherein said side chines (220) of said sides (22) rise upwards at a stern.

5. The hull according to claim 1, wherein said side chines (230) of said sides (23) have rectilinear edges.

* * * * *